United States Patent [19]

Umina

[11] Patent Number: 5,577,554
[45] Date of Patent: Nov. 26, 1996

[54] RADIANT HEATING SYSTEMS WHICH ARE MORE EFFICIENT TO BUILD, AND METHODS AND APPARATUSES FOR BUILDING THEM

[76] Inventor: John T. Umina, 160 Range Rd., Concord, Mass. 01742

[21] Appl. No.: 271,783

[22] Filed: Jul. 7, 1994

[51] Int. Cl.[6] ........................................ F24D 3/14
[52] U.S. Cl. ............................ 165/53; 165/56; 165/171
[58] Field of Search ............................ 165/53, 171, 49, 165/56

[56] References Cited

U.S. PATENT DOCUMENTS

| 2,004,857 | 6/1935 | Deriaz | 165/56 X |
| 4,212,348 | 7/1980 | Kobayashi | 65/49 |

FOREIGN PATENT DOCUMENTS

| 181054 | 7/1954 | Austria | 165/53 |
| 298442 | 5/1954 | Switzerland | 165/53 |
| 399681 | 10/1933 | United Kingdom | 165/53 |

OTHER PUBLICATIONS

Brochure, "Radiant–Trak: Heating Panels", Radiant Technology Inc., 4 pages, Date Unknown.
Brochure, "Radiant–Trak: Heating Panels", Radiant Technology, Inc., 1 page, Date Unknown.
Brochure, "Radiant Panel Heating", Wirsbo, 1 page, Date Unknown.
Brochure, "The Only Thing More Important Than How Your Home Looks, Is How It Feels", County Supply, Date Unknown.

Primary Examiner—Leonard R. Leo
Attorney, Agent, or Firm—Edward W. Porter

[57] ABSTRACT

A radiant heating system uses a conductive heat shield comprising a flat portion designed to be placed in contact with the underside of a floor and an elongated tube holding portion extending from the opposite side of the heat shield. Preferably the tube holding portion has an elongated opening for receiving tubing after the floor-contacting portion has been placed in contact with the underside of a floor, and has resilient restraining portions to hold the tubing in place once it has been inserted into that opening. It is also preferred that the tube holding portion be at least three quarters of an inch below the underside of any floor to which the flat portion is attached or is covered with a puncture-proof nail guard, so tubing in the tube holding portion will not be punctured by nails driven into the floor to which the heat shield is attached. It is preferred that the tube holding portion have a generally circular cross section which will conform to the surface of the tubing it holds, and, thus, will efficiently conduct heat from that tubing. In many embodiments the heat shield will have two such elongated tube holding portions, and will be formed from a sheet of conductive metal, such as aluminum. A methods for constructing buildings using such heat shields includes attaching such a heat shield to the underside of a first layer of flooring; placing tubing into the tube holding portion of the heat shield; and then nailing a layer of hardwood flooring into place. Since the invention's heat shields prevent the tubing they hold from being punctured by nails, the hardwood flooring can be installed after the heat shields and tubing, which makes construction easier and better.

10 Claims, 6 Drawing Sheets

PRIOR ART AND INVENTION

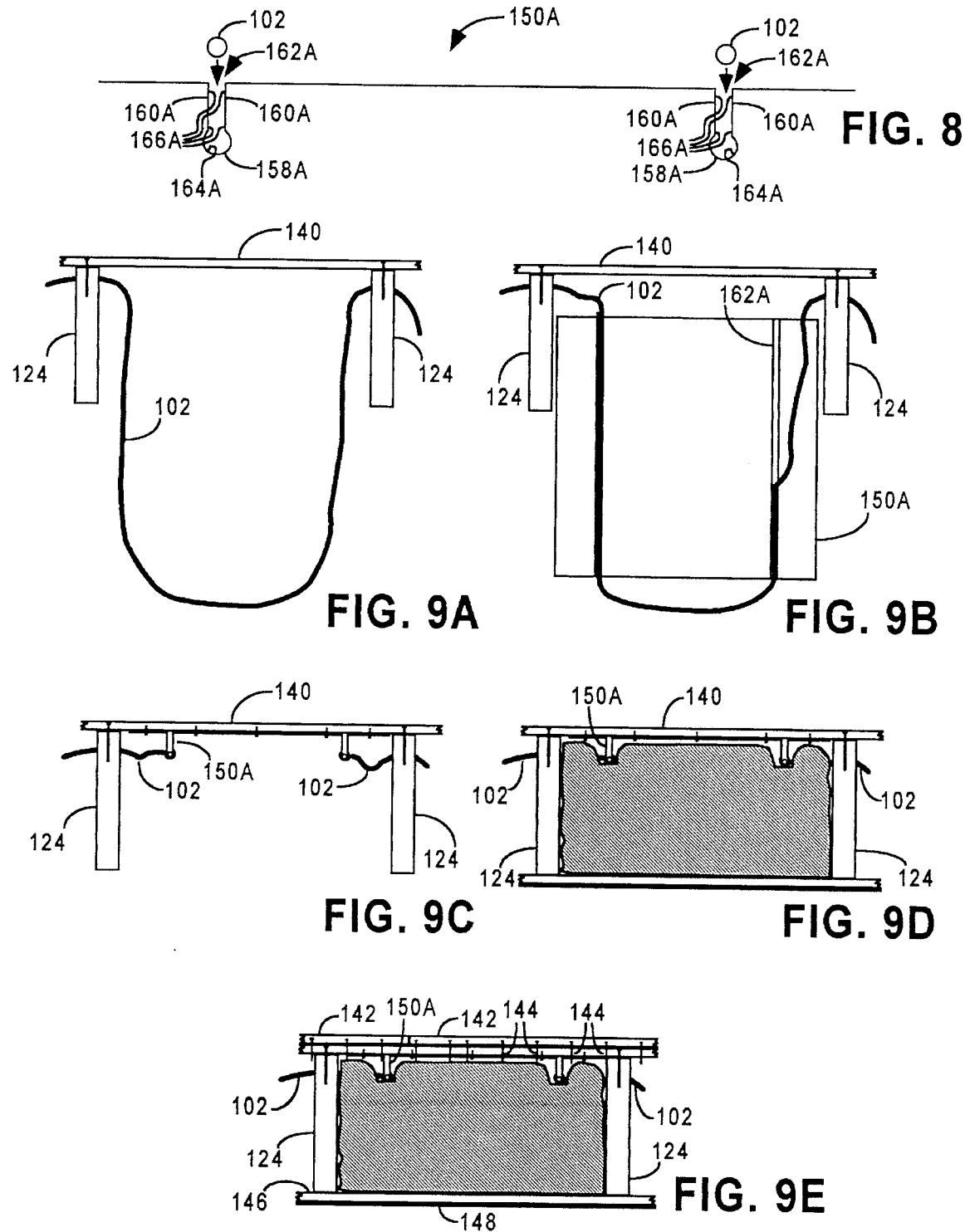

RADIANT HEATING SYSTEMS WHICH ARE MORE EFFICIENT TO BUILD, AND METHODS AND APPARATUSES FOR BUILDING THEM

FIELD OF THE INVENTION

The present invention relates to radiant heating systems, and more particularly to such systems which are more efficient to build, and to methods and apparatuses for building them.

BACKGROUND OF THE INVENTION

Radiant heating systems have become an increasingly popular way to heat homes, offices, and other buildings because they are more efficient than traditional heating systems.

A radiant heating system, such as the system 100 shown in FIG. 1, runs tubing 102 containing heated fluid 104, normally water, under each floor 106 of the building which is to be heated. The fluid is normally heated in a heater 108, containing a heating element 110 which is controlled electronically by a controller 112. The controller responds to an outdoor temperature sensor 125 placed on an outdoor wall to determine to what temperature the heater 108 should heat the system's water. Each room has a thermostat 114 located in it which causes a valve 115 to turn off the flow of heated water to tubing 102 under that room's floor if its temperature exceeds a temperature set on its thermostat. This could happen if something such as sunlight coming in windows, the use of a wood stove, or a crowd of people causes the room to be hotter than expected.

The tubing is commonly one half inch in diameter and is made of plastic. It is evenly spaced under the floor, as is indicated by the snaking of the tube 102 in FIG. 1 between the floor joists 124, so the floor is evenly heated. To further facilitate the even distribution of heat from the tubing, conductive heat shields 116, having parallel grooves for holding the tubing, are used. The tubing is placed in the grooves of the heat shield and the shields are nailed or stapled to the underside of the floor 106. These shields are normally made of a thin layer of conductive metal, such as sheets of aluminum approximately 0.012 to 0.022 thick. They help conduct heat away from the tubing and help evenly distribute it to the underside of the floor.

As a result of the even distribution of heat to the floor 106 there is little convection, so the heat rises up evenly from the floor, largely from conduction and radiation, as is indicated by the arrows 118 in FIG. 2. FIG. 2 shows the walls 120 and floor 106 of a room 122 in cross section. Below the floor 106 FIG. 2 shows the floor joists 124, the tubing 102, the heat shield 116, thermal insulation, such as fiberglass, 126, and the ceiling 128 of the room below.

FIG. 3 is a cross section of a room 122A similar to the room 122 shown in FIG. 2, except that room 122A has a more traditional wall mounted heater 130 through which a metal tube 132 carrying hot water runs. This more traditional heater does not conduct or radiate heat evenly throughout the room. Instead it relies on the convection currents 134 generated by the air it heats to distribute the heat is supplies to the room.

The radiant heating system shown in FIG. 2 has several advantages over the convection based heading system shown in FIG. 3. First, because the radiant heating system does not require convection to distribute its heat, it does not have to heat air to a temperature sufficiently high to cause efficient convection. As a result, radiant heating systems normally only have to heat their water to between ninety and one hundred and twenty degrees, whereas traditional convection based heating systems normally heat their water to about one hundred and eighty degrees. Operating with a lower water temperature is more efficient, because it causes less radiation from the portions of the system which are not delivering heat to places that are to be heated.

Radiant heating has another advantage in that the heat it generates is more even. Unlike convection based heating, which produces much hotter air near the heating element than far away from it, radiation based heating provides relatively even heat across the area of a room.

Because radiant heat greatly reduces the amount of convection, it greatly reduces the amount of heat that escapes up stair wells or that hovers near high ceilings. In fact, radiant heating systems can be designed so the heat they deliver is largely concentrated in the first six or seven feet above the floor. This enables a single floor to be heated without having heat escape to a different floor or to high ceilings.

FIG. 4 show an end view of a typical prior art heat shield 116A used with radiant heating systems under hardwood floors. It is formed of a thin sheet of aluminum containing two elongated grooves 136 into which the tubing 102 of the radiant heating system can be pushed, as is indicated by the arrows in that figure. Each groove have a generally circular shape, which is sized so that it will contact much of the surface of the tubing which is placed into it. The arc formed by the cross section of each groove is positioned so it will hold the tube against the bottom of the flooring against which the heat shield is placed.

Although prior art head shields, such as the shield 116A shown in FIG. 4 do a good job of conducting heat away from the tubing 102 and evenly distributing it to the underside of a wooden floor, it has the problem of being somewhat difficult to install, as will be explained with regard to FIGS. 5A–5F. These figures illustrate the steps normally used to install such a heat shield and its associated tubing. FIG. 5A shows a cross section of a portion of a wooden floor, with two floor joists 124, a first layer of wooden flooring 140, which is normally comprised of three quarter inch plywood. On top of it is placed a layer of hardwood flooring 142, which is usually approximately three quarters of an inch thick. The individual pieces of the hardwood flooring are held in place with nails 144, which are normally two inches long. These nails are normally driven into the sides of the pieces of hardwood so they will not show once the hardwood floor is complete. As a result, these nails normally stick out from the bottom of the first layer of flooring 140 by roughly three quarters of an inch.

Since these nails stick down through the bottom of the first layer of flooring by so much, the heat shield and its accompanying tubing can not be put in place before the hardwood floor is put down, or else the nails might puncture the tubing and ruin the thermal heating system. Instead the heat shield is not installed until the hardwood floor has been nailed down, as shown in FIG. 5A and then the portions of the nails 144 which stick down from the bottom of the first layer of flooring have been cut off, as shown in FIG. 5B. Once this has been done the heat shield and tubing can be installed. This is done by installing the tubing 102 between the joists 124 so that a long enough loop of it hangs down between the joists to fill the two grooves of the heat shield 116A, as is shown in FIG. 5C. Then the tubing is placed into the grooves of the heat shield, as is shown in FIG. 5D. Then the heat shield with the tubing contained in its grooves is nailed or stapled up to the underside of the first layer of flooring, as shown in FIG. 5E. Once this is done, thermal insulation 126 can be installed between the floor joists under the heat shield, and then a ceiling, such as the ceiling comprised a layer of plasterboard 146 covered with a skim coat of plaster 148, can be placed under the floor joists.

The prior art heat shield 116A and the method of installing it under hardwood floors has several disadvantages.

First, it requires the portions of the nails used to hold the hardwood flooring which stick down from the underside of the first layer of flooring to be clipped so the heat shield can be placed in contact with, or in close proximity to, the underside of that floor. Since it is usually difficult to clip all portions of the nails which stick down, this means the heat shield does not normally make as good a contact with the underside of the flooring as is desired.

Second, installing the tubing 102 in the grooves on the top side of the heat shield, as is shown in FIG. 5D, while the tubing is hanging down from holes in the joists and the heat shield is being held up in the air is less easy than could be desired.

Third, having to perform the plaster skim coating of ceiling below a floor after hardwood has been placed upon it has problems, since it is normally preferably to perform all major plastering in a construction project before hardwood floors are put down, because the spattering and moisture associated with plastering can be harmful to hardwood's finish.

SUMMARY OF THE INVENTION

It is an object of the invention to provide radiant heating systems, and methods and apparatuses for building them, which avoid the problems with the prior art pointed out above.

It is another object of the invention to provide heat shields for use in radiant heating systems which make a radiant heating system more easy to install.

According to one aspect of the present invention a conductive heat shield is provided for use with a radiant heating system comprising a heat-conducting flat portion designed to be placed in substantial contact with the underside of a floor and an elongated heat-conducting tube holding portion extending from the opposite side of the heat shield from the floor contacting surface. The tube holding portion has an elongated opening for receiving the tubing after the floor-contacting portion has been placed in contact with the underside of a floor, and has resilient restraining portions to hold the tubing in place once it has been inserted into that opening. This makes the radiant heating system easier to install because tubing can be placed in the heat shield after it has been attached to the underside of a floor.

According to another aspect of the invention a conductive heat shield is provided for use with a radiant heating system which comprises a heat-conducting flat portion designed to be placed in contact with the underside of a floor; a heat-conducting tube holding portion extending parallel to the floor contacting surface; and either a heat-conducting connecting portion designed to hold the tube holding portion at least three quarters of an inch below the floor-contacting flat portion or a puncture proof nail guard above the tube holding portion. The purpose of either positioning the tube holding portion at least three quarters of an inch below the floor-contacting portion or covering it with a nail guard is to allow the heat shield, its associated tubing, insulation and the ceiling below the heat shield to be installed before hardwood flooring is nailed on the floor above the heat shield.

In a preferred embodiment of this aspect of the invention the tube holding portion includes an elongated opening into which the tubing can be placed from underneath the heat shield once it has been attached to the underside of a floor.

Preferably the tube holding portion has resilient restraining portions along the length of its elongated opening to hold the tubing in place once it has been inserted into that opening. It is also preferred that the tube holding portion has a cross section which forms a circular arc having approximately the diameter of the tubing, so the inner surface of the tube holding portion can make substantial contact with the surface of the tubing and, thus, can efficiently conduct heat away from that tubing. In many embodiments the heat shield will have two such tube holding portions, and will be formed of a sheet of conductive metal such as aluminum. In other embodiments of the invention the connecting and tube holding portion will be both formed by a fold, or groove, in a sheet of metal from which the heat shield is formed.

According to other aspects of the invention, radiant heading systems and methods for installing them are provided using such heat shields. One such method includes assembling a plurality of parallel floor joists on which a floor is to be supported; placing a first layer of flooring upon the joists; attaching a heat shield which holds tubing at least three quarters of an inch below the underside of the first layer of flooring to which it is attached; placing a length of tubing to be used as part of a radiant heating system in the tube holding portion of the heat shield; and nailing a layer of hardwood flooring into place. Because of the distance which the tube holding portion is located below the underside of the first layer of flooring the hardwood can be nailed down after the heat shield and associated tubing are in place without danger of puncturing the tubing.

In most preferred embodiments of this method the tube holding portion of the heat shield includes an elongated opening into which the tubing is placed from underneath once the heat shield has been attached to the underside of a floor. In other embodiments of the method, the heat shield is one in which the tube holding and connecting portions are both formed as a part of an elongated fold in the side of the heat shield which contacts the underside of the floor and the tubing is inserted into the tube holding portion from the floor-contacting side of the heat shield before it is attached to the underside of the floor. In either case it is preferred that plastering be performed on the ceiling under the heat shield before the hardwood floor is nailed down on the floor above the heat shield.

DESCRIPTION OF THE DRAWINGS

These and other aspects of the present invention will become more evident upon reading the following description of the preferred embodiment in conjunction with the accompanying drawings, in which.

Figure 4:
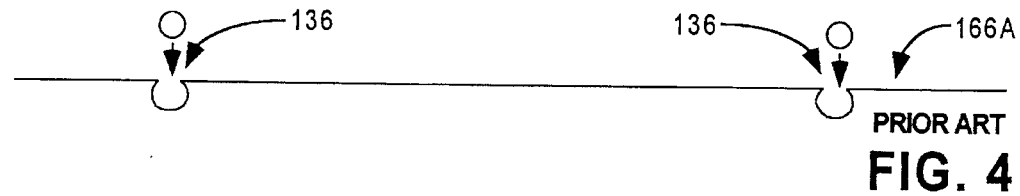
Figure 6:
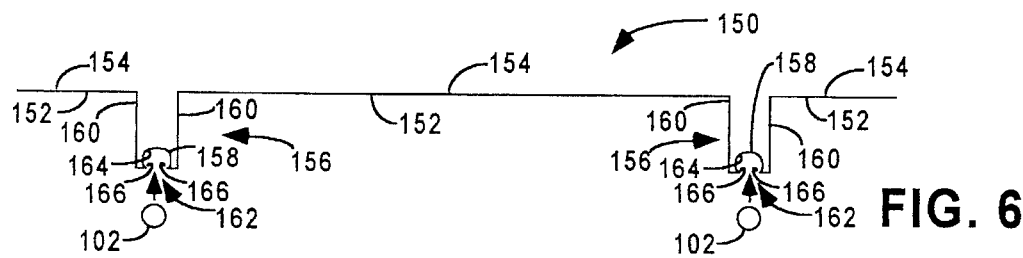
Figure 10:
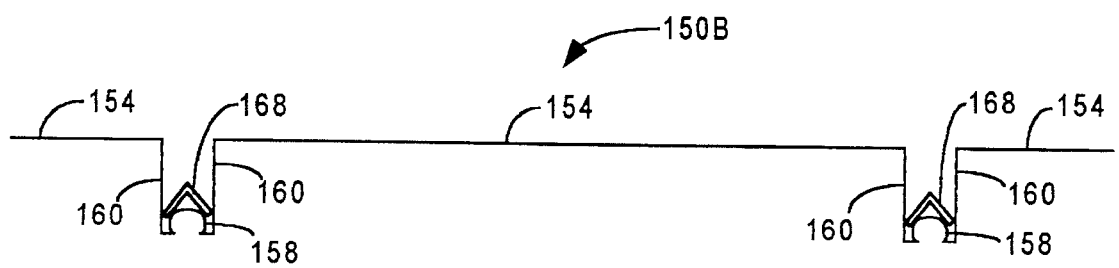
Figure 11:
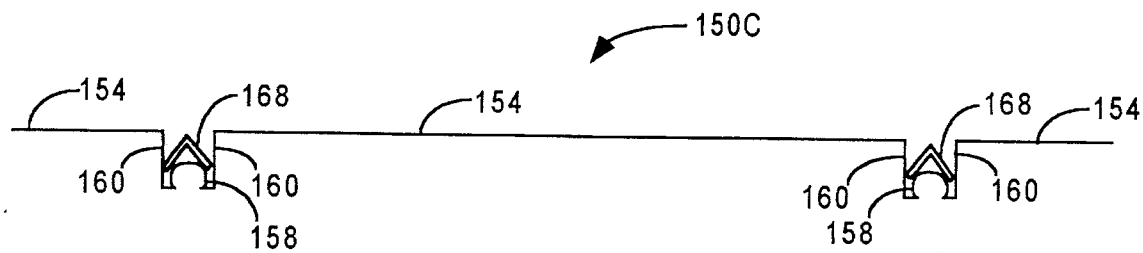

2, except that the room does not have a radiant heating system, but instead has a heating system which relies on convection to spread the heat it provides;

FIG. 4 is a cross sectional view of a heat shield used in prior art radiant heating systems;

FIGS. 5A–5F are cross sections of a portion of a floor which illustrate the steps necessary to build a hardwood covered floor with radiant heating and a ceiling below it using the prior art heat shield shown in FIG. 4;

FIG. 6 is a cross sectional view of a heat shield according to one embodiment of the present invention;

FIGS. 7A–7E are cross sections of a portion of a floor which illustrate the steps necessary to build a hardwood covered floor with radiant heating and a ceiling below it using the heat shield of FIG. 6;

FIG. 8 is a cross sectional view of a heat shield according to another embodiment of the present invention;

FIGS. 9A–9E are cross sections of a portion of a floor used to illustrate the steps necessary build a hardwood covered floor with radiant heating and a ceiling below it using the heat shield of FIG. 8;

FIG. 10 is a heat shield according to yet another embodiment of the present invention which is similar to that shown in FIG. 6, except that it has a nail guard placed over its tube holding portion;

FIG. 11 is a heat shield according to still another embodiment of the present invention which is similar to that shown in FIG. 10 except that the tube holding portion is not as far below the main flat portion of the heat shield as is the tube holding portion of FIG. 10.

DETAILED DESCRIPTION OF PREFERRED EMBODIMENTS

Figure 1:
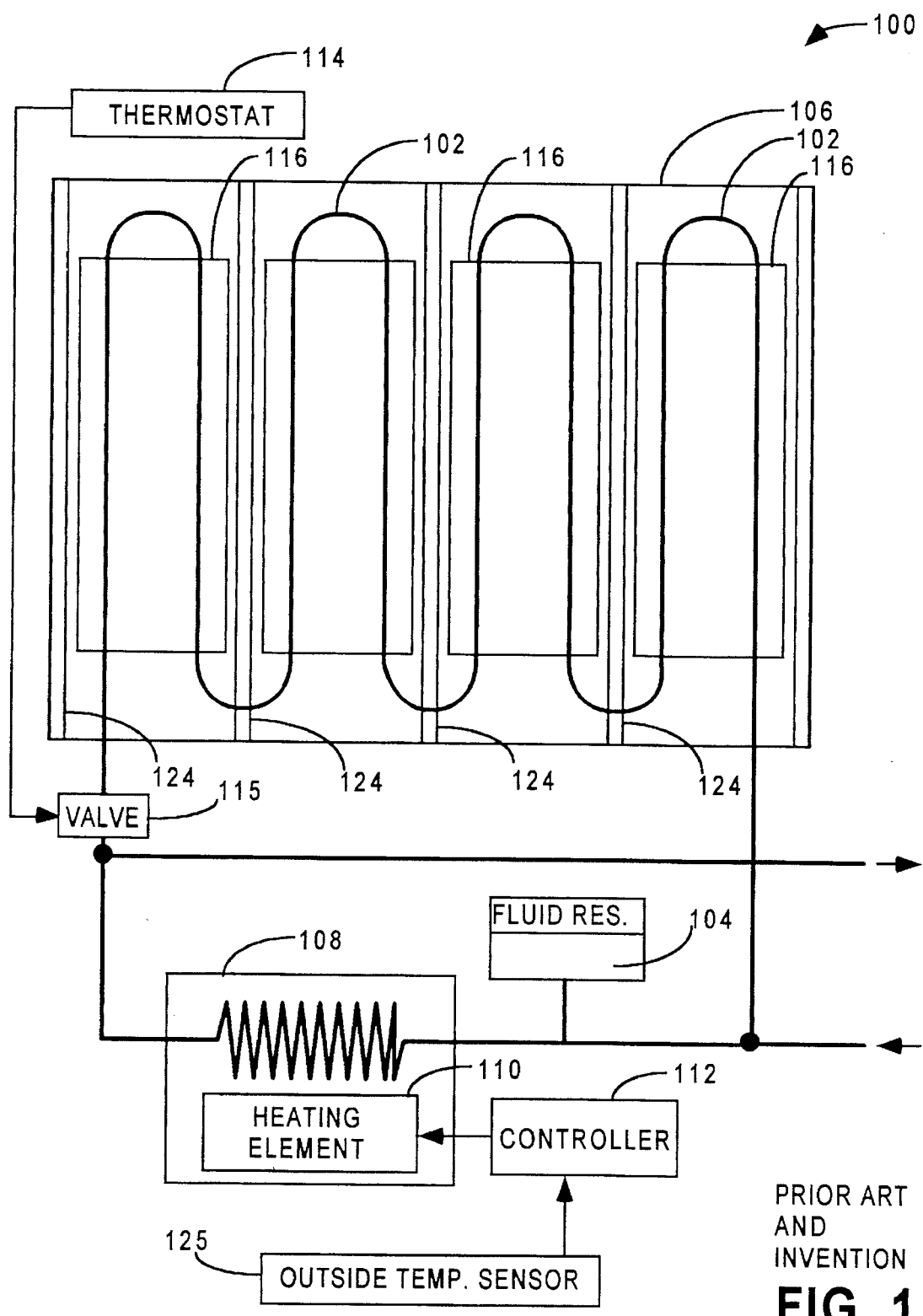
FIG. 1 is a schematic representation of a radiant heating system, which is applicable both to prior art radiant heating systems and to radiant heating system using the present invention.
Figure 2:
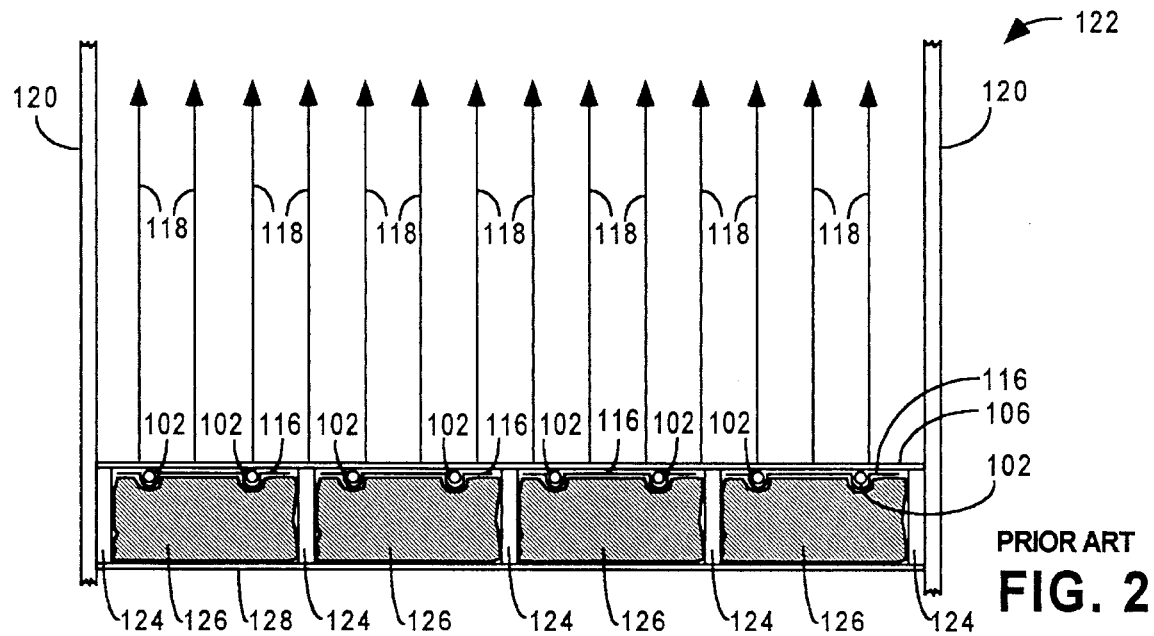
FIG. 2 is a schematic representation of a cross section of the walls and floor of a room heated by a prior art radiant heating system, showing the evenness of the heat provided.
Figure 3:
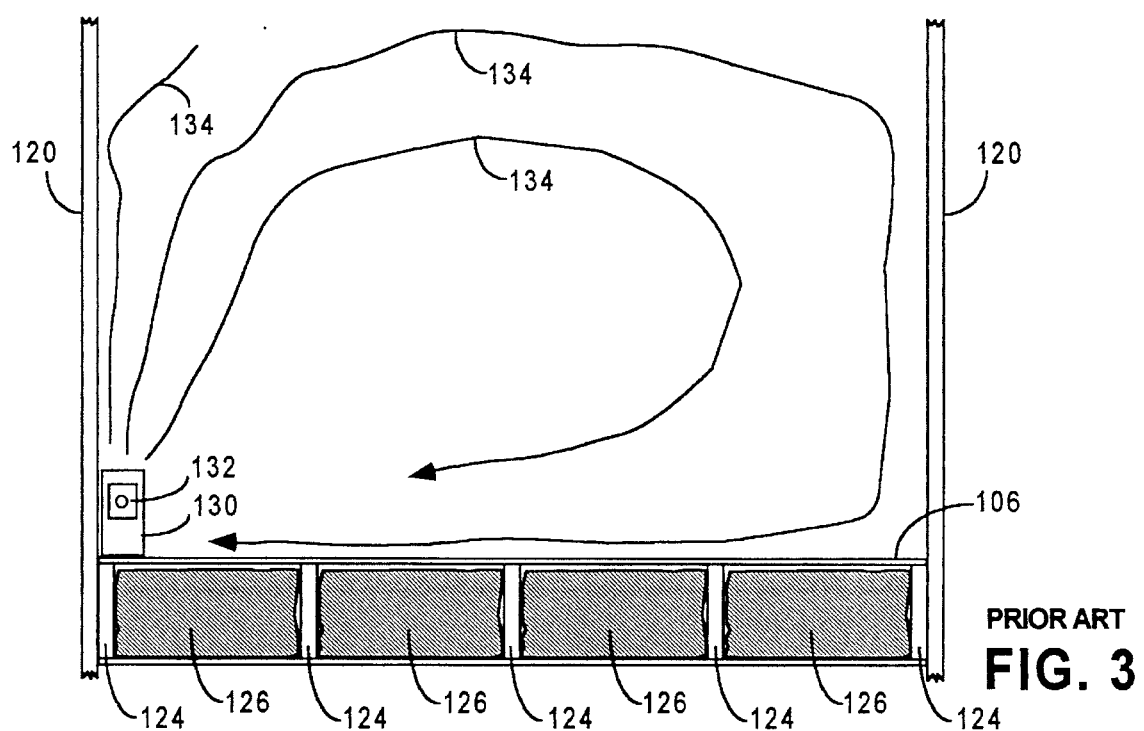
FIG. 3 is a schematic representation of a cross section of the walls and floor of a room similar to that shown in FIG.

FIG. 6 shows a heat shield 150 according to a preferred embodiment of the present invention. This new heat shield, and the other new heat shields of the invention 150A, 150B, and 150C described below, can all function as the heat shield 116 shown in FIG. 1, and can all be used to provide the even heat represented by the arrows 118 shown in FIG. 2.

The heat shield 150 of FIG. 6 is formed of a sheet of conductive material, such as a sheet of aluminum metal between approximately one and three hundreds of an inch in thickness. The majority of the heat shield's area is comprised of flat portions 152's. The upper surface 154 of these flat portions form the floor-contacting surface of the heat shield, that is, its surface which is intended to contact the underside of a floor to be heated by the heat shield.

In the preferred embodiment of the invention shown in FIG. 6, the total overall width of the heat shield is approximately 15 inches and its total overall length is approximately two to four feet. The length of the shield is preferably at least two feet because of the desire to cover as large length of flooring with one shield as is convenient at one time. In other embodiments the total overall length and width of the floor contacting area should be at least one foot by six inches so that the shield has enough floor contacting area to help conduct heat from the pipe to the floor. Where the loops of tubing under a given portion of flooring are substantially longer than the heat shields used, multiple heat shield can be aligned to hold up, and conduct heat from, such long loops.

The sheet metal of the heat shield 150 has two sets of elongated folds 156, each of which forms a roughly semi-cylindrically shaped tube holding portion 158, for holding a length of tubing 102, and a connection portion 160 which supports the tube holding portion from the heat shield's flat portions 152. In other embodiments of the heat shield a different number of tube holding portions might be used. For example, narrower heat shields with only one tube holding portion are provided for locations were the floor joists are very close together.

Each tube holding portion 158 has a cross section, as shown in FIG. 6, in the plane perpendicular to the length of its elongation which forms an arc of a circle having a diameter approximately equal to the diameter of the tubing 102 it is designed to hold. This tubing is commonly one half inch in diameter. The tube holding portion has such a cylindrically shaped inner surface 164 so it can fit closely against the outside of the tubing it is to hold. This enables it to efficiently conduct heat away from the tubing toward the floor-contacting surface 154 of the heat shield. The cross section of this cylindrically shaped surface extends more than half way around the circle defined by its diameter, so that the elongated opening 162 to the cylindrically shaped tube holding portion is somewhat narrower than the diameter of the tubing 102. Thus, when the tubing 102 is pushed into the elongated opening of the tube holding portion, as is indicated by the arrows in FIG. 6, the portions of the cylindrically shaped surface 164 near that opening have to be deflected, or pushed apart, to allow the tube to be inserted. Since the heat shield is made of relatively thin metal, the cylindrically shaped surface is resilient enough to bend open as the tubing is forced into it, and then to bend back to substantially its original position once the tubing is inside the tube holding portion. Thus, the resilient portions of the cylindrically shaped surface near the elongated opening 162 restraining the tube in place once it has been inserted into the tube holding portion.

The connecting portion 160 which extends from the heat shield's flat floor-contacting surface 154 down to the tube holding portion 158 is long enough to keep the top of the tubing held by the tube holding portion out of the reach of any nails which might stick down through the bottom of the floor to which the heat shield is attached when a hardwood floor is nailed in place. Since first layer of plywood flooring upon which a hardwood floor is normally laid is usually three quarters of an inch thick, since the hardwood flooring is normally three quarters of an inch thick, since the nails used to hold the hardwood floors in place are normally two inches long, and since the nails are usually stuck into the side of the hardwood flooring to prevent their heads from showing once the floor is completed, the top of the tubing 102 should be held at least three quarters of an inch below the level of the floor-contacting surface 154. To be safe, it is preferred that the top of the tube holding portion actually be more than one and one quarter inch below the heat shield's floor-contacting surface, so that even if a two inch nail were nailed directly into the top of the first layer of plywood flooring, it could not puncture the tubing 102.

Figure 7A:
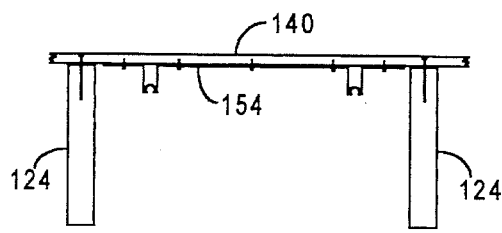
Figure 7B:
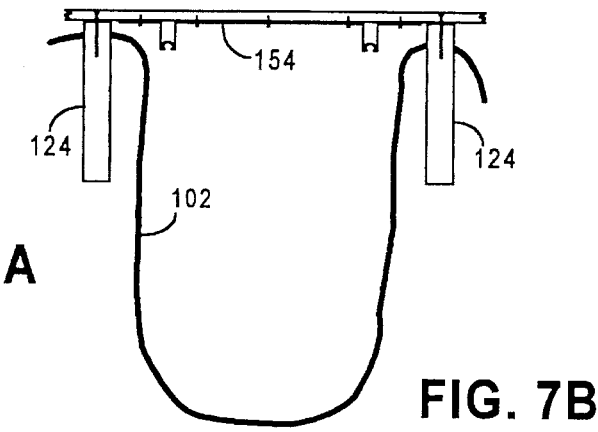
Figure 7C:
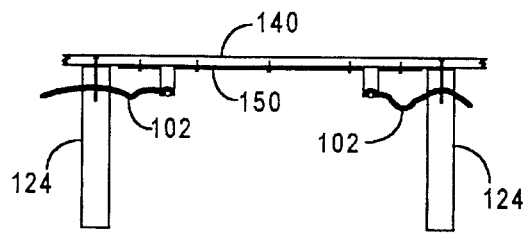
Figure 7D:
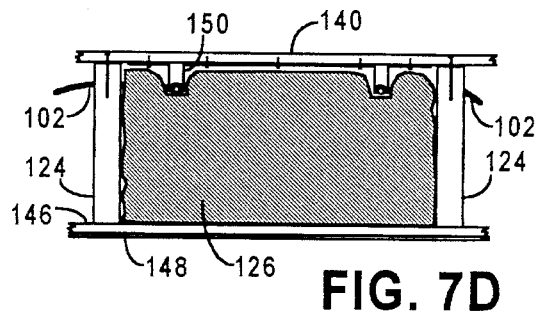
Figure 7E:
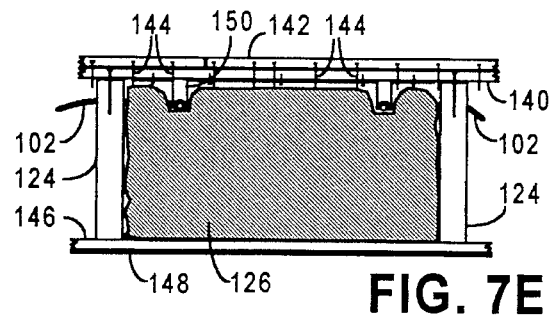

FIGS. 7A–7E show how the heat shield 150 of FIG. 6 can be used to install radiant heating system in a portion of a floor and the ceiling below it. As FIG. 7A shows, the heat shield 150 can be attached to the underside of the first layer of wooden flooring 140 as soon as that first layer has been nailed in place. Then, as FIG. 7B shows, the tubing 102 can be strung into place between the floor joists 124. Then, as FIG. 7C shows, the tubing 102 can be pressed up into the elongated openings 162 of the heat shield's two tube holding portions 158. This can be done because the elongated opening 162 of the heat shield 150, which faces downward, is accessible from below once the heat shield has been nailed or stapled up against the underside of a floor. Then as shown in FIG. 7D, thermal insulation 126 can be stuffed or stapled under the heat shield between the joists 124, plasterboard 146 can be placed under the joists, and a skim coat of plaster 148 can be placed under the plasterboard 146 to form a finished ceiling for the room below the floor. Finally, as is shown in FIG. 7E the layer of hardwood flooring 142 can be nailed in place without fear of puncturing the tubing 102, because the heat shield 105 positions the tubing 102 out of reach from the nails 144 used to hold the individual pieces of hardwood in place.

The method of installing heat shields and tubing shown in FIGS. 7A–7E has several important advantages.

Figure 5A:
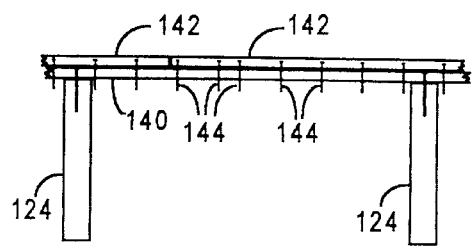
Figure 5B:
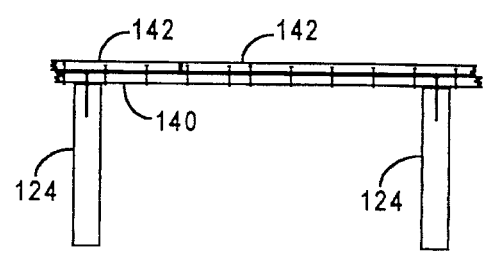
Figure 5C:
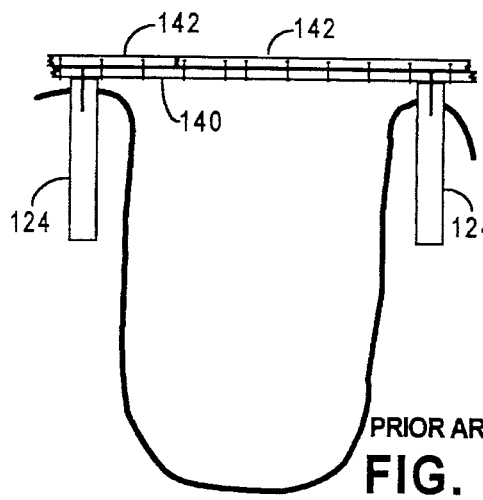
Figure 5D:
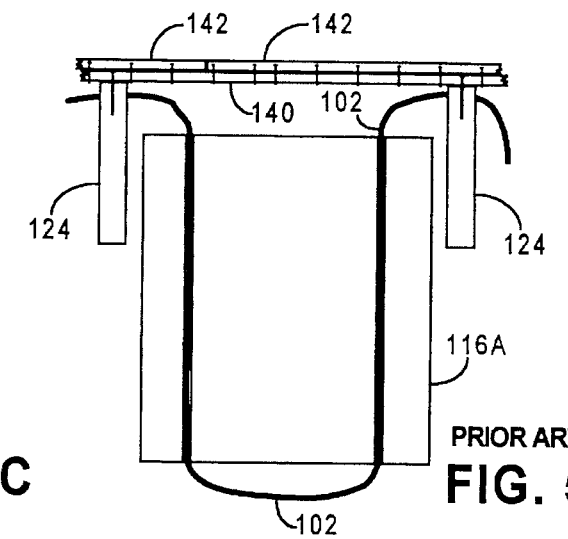
Figure 5E:
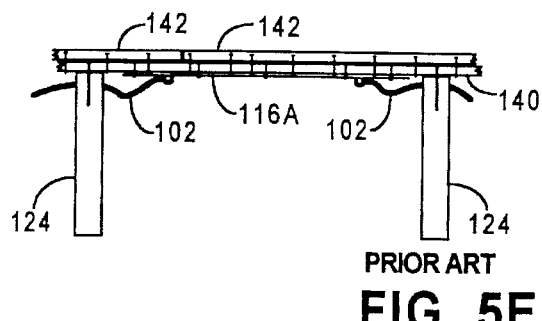
Figure 5F:
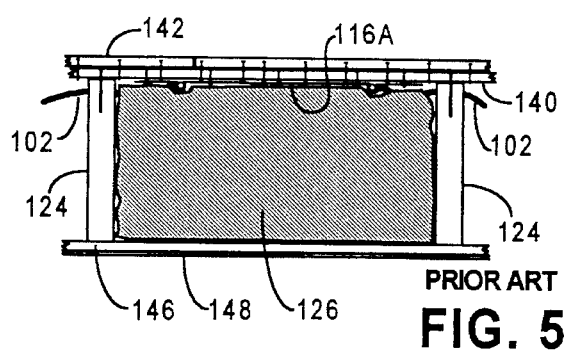

First, it is easier to install tubing into a heat shield with it in place than it is into a prior art heat shield which has to be held by hand while tubing is placed into it, as is indicated in FIG. 5D. Since the invention's heat shield 150 can be positioned in its intended place before the tubing is placed through the joists and pressed into its tube holding grooves, it is easier to more accurately position the tubing relative to the heat shield so as to not end up with too long or too short a length of tubing between each pair of joists.

Second, the heat shield 150 allows the heat shield and tubing to be put in place before the hardwood flooring 142 is nailed down. This not only avoids the need to clip the portions of hardwood floorings nails which stick through the bottom of the first layer of flooring, as is required with the prior art heat shields, as indicated by FIGS. 5A and 5B, but it also allows the ceiling, including its plaster skim coat, to be completed below the installed heat shield before the hardwood flooring is installed. This has several advantages. First, it prevents the moisture associated with the skim coating from having any harmful effect upon the hardwood flooring it. Furthermore, it allows the plasterboarding, plastering, and painting in a construction project to be completed before hardwood floors are installed, protecting the surface of such floors from unnecessary moisture, plaster, paint, and scratches. It also allows all such plasterboarding, plastering, and painting to be done at one time on all floors of a construction project, saving costs.

FIG. 8 shows the cross section of a heat shield 150A made according to an alternate embodiment of the invention. This heat shield has flat portions 152 with floor-contacting surfaces 154 which are virtually identical to those of the heat shield 150 shown in FIG. 6. But the elongated folds 156A in the sheet metal of the heat shield 150A form tube holding portions 158A and connecting portions 160A in which the cylindrically shaped inner surface 164A of the tube holding portion is part of the same side of the sheet metal as the floor-contacting surface 154 and in which the elongated opening into which the tubing 102 is to be placed faces upward.

Like the heat shield 150 shown in FIG. 6, the heat shield 150A has a connecting portion 160A which supports its tube holding portion at a position so that the top of any tubing 102 it holds will be more than one and one quarter inch below the floor to which the heat shield 150A is attached. Thus, it has the advantage of letting the heat shield and its associated tubing be put in place before the hardwood flooring is put in place. But unlike the heat shield 150, the heat shield 150A does not have the advantage of allowing tubing to be inserted into its tube holding portions after it has been attached to the bottom of a floor. As a result, the method of building a section of flooring with such a heat shield is somewhat different than the method shown in FIGS. 7A–7E, as is indicated by FIGS. 9A–9E.

With the heat shield 150A, after a first layer of plywood flooring 140 has been placed down, the tubing 102 can be strung between the floor joists 124, as is shown in FIG. 9A. Then while the heat shield 150A is held up, the tubing 102 is pushed into the elongated openings 162 of its tube holding portions 158, as is indicated by the arrows in FIG. 8 and by FIG. 9B. The sheet metal of which the heat shield 150A is formed is flexible enough so that the two facing surfaces of each of its connecting portions 160 and the upper portion of the cylindrically shaped inner surface of each of its corresponding tube holding portions can be pushed apart as the tube is pushed into that tube holding portion's cylindrically shaped groove. Once the tubing is in place, the resilience of the metal pushes it back into the shape shown in FIG. 8, so as to hold the tubing in place.

Once the tubing 102 has been placed in the entire length of each of the heat shield's tube holding portions, the heat shield and its associated tubing are nailed or stapled up against the underside of the first layer of flooring 140, as is shown in FIG. 9C. Then the insulation 126, plasterboard 146 and skim coating 148 can be put in place. Once this is done the hardwood floor 142 can be nailed down, because the heat shield 150A hold the tubing 102 sufficiently far below the bottom of the flooring that it is save from the nails 144 used to hold the hardwood in place.

FIG. 10 shows a heat shield 150B according to yet another embodiment of the invention. The heat shield 150B is identical to the heat shield 150 shown in FIG. 6, except that it has a nail guard 168 extending above the length of each of its tube holding portions 158. Each nail guard is formed of metal thick enough, such as one sixteen of an inch thick, to prevent a nail driven toward it from above from puncturing tubing held in the tube holding portion. Preferably the nail guard is formed of a piece of metal which is folded to form a angle which points upward, as is shown in FIG. 10. This will tend to deflect most nails which are driven down towards the nail guard.

FIG. 11 shows a heat shield made according to still another embodiment of the invention which is identical to that shown in FIG. 10, except that its connection portions 160 hold the top of their associated tube holding portion less than three quarters of an inch below its floor-contacting surface 154. It can do this without fear that tubing in the tube holding portions will be punctured by nails used to hold down hardwood flooring because the nail guard will protect the tubing from being punctured by such nails. Thus, this heat shield can be installed using the method is shown in FIGS. 7A–7E.

It should be understood that the forgoing descriptions and drawings are given merely to explain and illustrate the invention and that the invention is not to be limited thereto, except in so far as the interpretation of the appended claims are so limited. Those skilled in the art who have this disclosure before them will be able to make modifications and variations therein without departing from the scope of the invention.

For example, it should be understood that the heat shield embodying the invention can be made of a conductive material other than aluminum. Likewise its thickness can be different than that specified above. In other embodiments the tube holding portion can use means other than a cylindrically shaped surface formed of resilient material whose cross-section forms more than a half circle to hold tubing in place. For example, in such other embodiments clips or other attaching means could be used to hold the tubing in place. In yet other embodiments the tube holding and connecting portions of the heat shield need not be formed by folds from a single sheet of metal, but instead could be formed of separate pieces which are welded or otherwise connected to the bottom of such a sheet forming the floor-contacting surface of the heat shield. It should also be understood that in some embodiments of the invention the elongated opening into which tubing is placed could actually point upward although it is accessible from the underside of the heat shield. In yet other embodiment, the tube holding portion need not have a cylindrical shape and need not be designed to extend around a substantial portion of the circumference of the tubing it is designed to hold.

Furthermore, it should be understood that the invention's methods of building a floor including its heat shields and associated tubing need not be limited to the precise ordering of steps shown in FIGS. 7A–7E or 9A–9E. For example, it would be possible to string the tubing through the floor joists before installing the first layer of flooring, or before installing the heat shield 150 shown in FIG. 7A.

It should also be understood that although the invention is designed mainly for use with hardwood flooring, it is applicable under any type of flooring where nails might be driving down through the floor after the heat shield is in place.

Furthermore, it should be understood that the precise size and shape of the various parts of the present invention can be changed without departing from the invention's intended scope, and that various sub-combinations of the features disclosed in the preferred embodiment are also covered by that intended scope.

What I claim is:

1. A conductive heat shield for use with a radiant heating system in which tubing for conveying heated fluid is run on an underside of a floor to supply heat to the floor, said heat shield comprising:
    a heat-conducting flat portion having a floor-contacting surface designed to be placed in substantial contact with the underside of said floor, said floor-contacting surface having a combined length of at least one foot and a combined width of at least six inches;
    an elongated heat-conducting tube-holding portion positioned to be below the flat portion when the floor-contacting surface is placed against the underside of the floor, said tube-holding portion:
        extending in a direction generally parallel to the floor-contacting surface and being shaped to hold a portion of said tubing within a tube-holding space,
        having an elongated opening for receiving said tubing when said floor-contacting portion is placed against the underside of a floor, and
        having resilient restraining portions positioned along the elongated opening which have to be deflected to insert the tubing in said elongated opening and which hold the tubing in place once the tubing has been inserted into the elongated opening; and
    a nail guard positioned to be above the tube-holding portion when said floor-contacting surface is placed against the underside of the floor, said nail guard being sufficiently puncture resistance to prevent nails used to nail down hardwood floors from entering said tube-holding space.

2. A conductive heat shield for use with a radiant heating system in which tubing for conveying heated fluid is run on an underside of a floor to supply heat to the floor, said heat shield comprising:
    a heat-conducting flat portion having a floor-contacting surface designed to be placed in substantial contact with the underside of said floor, said floor-contacting surface having a combined length of at least one foot and a combined width of at least six inches;
    an elongated heat-conducting tube-holding portion positioned to be below the flat portion when the floor-contacting surface is placed against the underside of the floor, said tube-holding portion extending in a direction generally parallel to the floor-contacting surface and being shaped to hold a portion of said tubing within a tube-holding space; and
    a nail guard positioned to be above the tube-holding portion when said floor-contacting surface is placed against the underside of the floor, said nail guard being sufficiently puncture resistance to prevent nails used to nail down hardward floors from entering said tube-holding space.

3. A conductive heat shield as in claim 2 wherein said nail guard is formed from an elongated piece of puncture resistant material which is shaped to have two angled surfaces which come together in an elongated point positioned to point upward when said floor-contacting surface is placed against the underside of said floor so that nails driven down toward the nail guard from above will tend to hit one of the angled surfaces and tend to be deflected by it.

4. A radiant heating system comprising:
    a water heating device;
    tubing for circulating the heated water;
    a floor having a top side and an underside;
    a heat shield for holding the tubing in place under said floor and for conducting the heat of the water in the tubing to an area of the floor, said heat shield having a length and a width and including:
        a heat-conducting flat portion having a flat floor-contacting surface placed in substantial contact with an underside of a portion of said floor, said floor-contacting surface having a combined length of at least one foot in the direction of said heat shield's length and a combined width of at least six inches, which combined width constitutes a substantial majority of the heat shield's width;
        a heat-conducting tube-holding portion below the flat portion, said tube-holding portion extending in a first direction generally parallel to said flat portion and being shaped to support a length of tubing extending in said first direction and to conduct heat away from said tubing; and
        a heat-conducting connecting portion designed to extend down from said flat portion to said tube-holding portion, to support the tube-holding portion at least three quarters of an inch below the underside the floor to which the floor-contacting surface is attached, and to conduct heat from the tube-holding portion up to said floor-contacting surface;
    wherein said floor includes a first layer of wood and a second, top, layer comprised of hardwood which is nailed in place onto the first layer of wood with nails that stick down through the flat portion of said heat shield, but do not puncture the tubing because of the distance at which the connecting portion cause the tube-holding portion to be below the underside of the floor.

5. A radiant heating system as in claim 4 further including insulation placed under said heat shield.

6. A method of installing a radiant heating system in a building comprising the steps of:
    assembling a plurality of parallel floor joists on which a floor is to be supported;

placing a first layer of flooring upon the joists;

attaching a heat shield to an underside of the first layer of flooring, said heat shield having a length and a width and including:

a heat-conducting flat portion having a flat floor-contacting surface placed in substantial contact with the underside of a portion of said floor, said floor-contacting surface having a combined length of at least one foot in the direction of said heat sheild's length and a combined width of at least six inches, which combined width constitutes a substantial majority of the heat shield's width;

a heat-conducting tube-holding portion below the flat portion, said tube-holding portion extending in a first direction generally parallel to said flat portion and being shaped to support a length of tubing extending in said first direction along a portion of said length and to conduct heat away from the tubing; and a heat-conducting connecting portion designed to extend down from said flat portion to said tube-holding portion, to support the tube-holding portion at least three quarters of an inch below the underside the floor to which the floor-contacting surface is attached, and to conduct heat from the tube-holding portion up to said floor-contacting surface;

placing a length of tubing to be used as part of a radiant heating system in the tube-holding portion of the heat shield; and nailing a layer of hardwood flooring into place by driving nails through the hardwood layer, the first layer of flooring, and the flat portion of the heat shield, but not through the tubing because of the distance which the tubing is held below the underside of the floor by said tube-holding portion of the heat shield.

7. A method as in claim 6 wherein:

said tube holding portion of the heat shield includes an elongated opening into which said tubing can be placed, said opening being positioned so said tubing can be placed into it from underneath once the floor-contacting surface of the heat shield has been attached to the underside of the floor; and wherein said step of placing a length of tubing in said tube holding portion of the heat shield is performed after the heat shield has been attached to the underside of said floor by placing said tubing in said elongated opening from below the heat shield.

8. A method as in claim 6 wherein:

said tube holding and connecting portions of said heat shield are both formed as a part of an elongated fold in said sheet of metal having two generally opposing sides, with the tube holding portion forming the lower portion of the fold, so that tubing can be inserted into the tube holding portion from the side of the heat shield upon which the floor-contacting surface is located; and wherein said step of placing a length of tubing in said tube holding portion of the heat shield is performed before the heat shield has been attached to the underside of said floor by placing said tubing into said elongated fold.

9. A method as in claim 6 further including the step of installing and plastering a ceiling under the joists after the heat shield and tubing have been attached to the underside of the first layer of flooring but before the hardwood floor is nailed down.

10. A method as in claim 9 further including the step of installing insulation under the heat shield, between the joists, after the heat shield has been attached to the underside of the first layer of flooring and the tubing has been placed in the heat shield, but before the ceiling is installed under the joists.

* * * * *